US006425559B1

(12) United States Patent
Oliver et al.

(10) Patent No.: US 6,425,559 B1
(45) Date of Patent: *Jul. 30, 2002

(54) GAS LASER CHAMBER WITH VERTICAL VIBRATION ISOLATOR

(75) Inventors: I. Roger Oliver, San Diego; Alex P. Ivaschenko, La Jolla; William N. Partlo, Poway; Palash P. Das, Vista, all of CA (US)

(73) Assignee: Cymer, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/675,492

(22) Filed: Sep. 29, 2000

(51) Int. Cl.$^7$ ................................................ F16M 11/00
(52) U.S. Cl. ..................... 248/176.1; 248/676; 248/678
(58) Field of Search ............................... 248/176.1, 676, 248/678, 139, 146, 550, 179.1, 180.1, 278.1, 638; 372/107, 108, 109

(56) References Cited

U.S. PATENT DOCUMENTS

| | | | | |
|---|---|---|---|---|
| 3,686,300 A | * | 8/1972 | Hohenstein | 331/94.5 |
| 3,768,035 A | * | 10/1973 | Zar | 331/94.5 |
| 4,700,044 A | * | 10/1987 | Hokanson et al. | 219/121 LC |
| 4,723,254 A | * | 2/1988 | Turner | 372/59 |
| 4,959,840 A | * | 9/1990 | Akins et al. | 372/57 |
| 4,977,573 A | * | 12/1990 | Bittenson et al. | 372/81 |
| 5,247,537 A | * | 9/1993 | Kaiser et al. | 372/107 |
| 5,450,346 A | * | 9/1995 | Mitzoguchi et al. | 372/59 |
| 5,863,017 A | | 1/1999 | Larson et al. | 248/176.1 |
| 6,109,574 A | | 8/2000 | Pan et al. | 248/176.1 |
| 6,111,907 A | * | 8/2000 | Ozarski | 372/107 |

* cited by examiner

Primary Examiner—Ramon O. Ramirez
(74) Attorney, Agent, or Firm—John R. Ross (57) ABSTRACT

A chamber/optics support structure for a laser having a laser chamber with a vibration source. The chamber and the laser resonance cavity optical elements are supported on a platform. The chamber is supported by a plurality of wheels which in turn rests on two tracks on track supports mounted on the platform. A vertical vibration isolator isolates vertical vibrations originating in the chamber from the laser optics. A flexible clamp flexibly clamps the chamber in a horizontal position to align it with the resonance cavity optical elements and to substantially decouple vibration between the chamber vibration source to the optical elements in a frequency range of concern.

The invention is especially useful for positioning the heavy laser chamber of a narrow band excimer laser and for decoupling vibrations resulting from its blower from the lasers line narrowing module and output coupler. In a preferred embodiment the plurality of wheels is three wheels, two of which rest in a V-groove track and one of which rests on a flat track. This preferred embodiment uses two flexible clamps each having an adjustment bolt and four symmetrically spaced silicon rubber vibration isolators. Precise horizontal alignment of the chamber is accomplished using the adjustment bolt which is then held in position with a lock nut and a clamping bolt. Silicon rubber dampers in the isolators decouple horizontal chamber vibrations from the optical elements.

In specific embodiments, the vertical vibration isolator may be a flexible liner in the wheels or in the rails or alternatively a pad on which the chamber rests.

17 Claims, 15 Drawing Sheets

GAS LASER CHAMBER WITH VERTICAL VIBRATION ISOLATOR

BACKGROUND OF THE INVENTION

In many gas lasers including many excimer lasers, a gain medium is produced in a laser chamber by a discharge through a gas between two electrodes. For high repetition rates it is normally necessary to circulate the gas so that fresh gas is available between the electrodes at the beginning of each pulse. Often this circulation is provided by a blower with a tangential blower blade structure located inside the laser chamber which is driven by an electric motor and supported by bearings.

For many laser applications laser beam parameters must be controlled to very tight tolerances in terms of pulse energy, beam cross sectional dimensions, wavelength and bandwidth. Vibration, especially at resonant frequencies produced by the blower, can affect laser optical components and degrade laser beam quality.

In line narrowed excimer lasers a well known technique is to mount the laser optics separate from the laser chamber which contains the rapidly rotating blower, with the output coupler at the output side of the laser and a line narrowing unit at the opposite side of the laser. Although mounted separately, both the chamber and the laser optics are typically contained within a laser cabinet and both are mounted on the same laser frame.

U.S. Pat. No. 6,109,574 recently issued on Aug. 29, 2000 describes a support structure including two flexible clamps for isolating chamber produced vibrations in the horizontal direction normal to the direction of the laser beam. U.S. Pat. No. 6,109,574 is incorporated herein by reference. In the patent, the Applicants stated that "Frame 100 is very stiff in the vertical direction so that the transfer of vertical vibrations from this chamber through the frame elements to the optical components is very small." Therefore, no further solution was proposed to deal with the vertical vibrations.

What is needed is a laser support structure to minimize the effects of vertical vibration.

SUMMARY OF THE INVENTION

The present invention provides a chamber/optics support structure for a laser having a laser chamber with a vibration source. The chamber and the laser resonance cavity optical elements are supported on a platform. The chamber is supported by a plurality of wheels which in turn rests on two tracks on track supports mounted on the platform. A vertical vibration isolator isolates vertical vibrations originating in the chamber from the laser optics. A flexible clamp flexibly clamps the chamber in a horizontal position to align it with the resonance cavity optical elements and to substantially decouple vibration between the chamber vibration source to the optical elements in a frequency range of concern.

The invention is especially useful for positioning the heavy laser chamber of a narrow band excimer laser and for decoupling vibrations resulting from its blower from the lasers line narrowing module and output coupler. In a preferred embodiment the plurality of wheels is three wheels, two of which rest in a V-groove track and one of which rests on a flat track. This preferred embodiment uses two flexible clamps each having an adjustment bolt and four symmetrically spaced silicon rubber vibration isolators. Precise horizontal alignment of the chamber is accomplished using the adjustment bolt which is then held in position with a lock nut and a clamping bolt. Silicon rubber dampers in the isolators decouple horizontal chamber vibrations from the optical elements.

In specific embodiments, the vertical vibration isolator may be a flexible liner in the wheels or in the rails or alternatively a pad on which the chamber rests.

DETAILED DESCRIPTION OF PREFERRED EMBODIMENTS

A preferred embodiment of the present invention is described by reference to the drawings. The improvements over the prior art structure described in U.S. Pat. No. 6,109,574 are specifically described below under the heading "Vertical Vibration Isolation". Immediately following sections are extracted from U.S. Pat. No. 6,109,574 so as to provide a complete description of the best mode of practicing the invention.

Laser Support Frame

Figure 1:
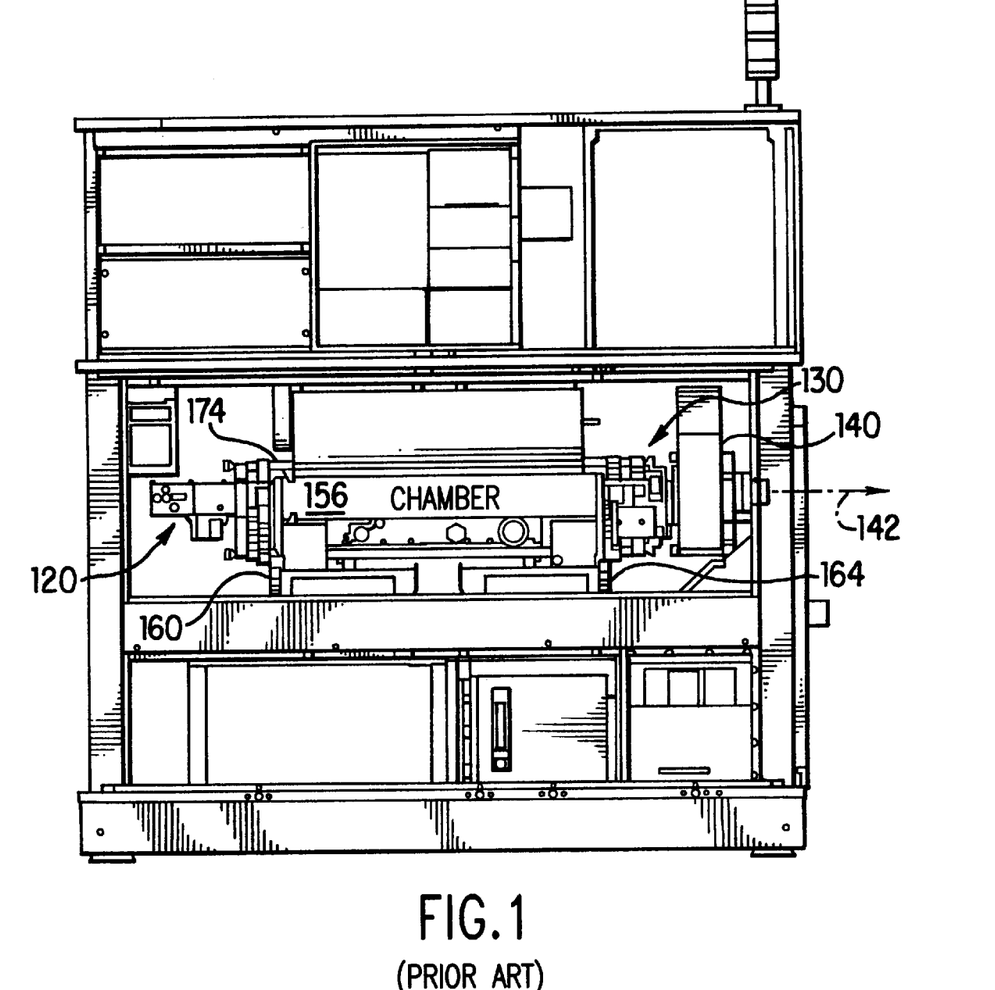
FIG. 1 is a drawing showing features of a state-of-the-art excimer laser.
Figure 1A:
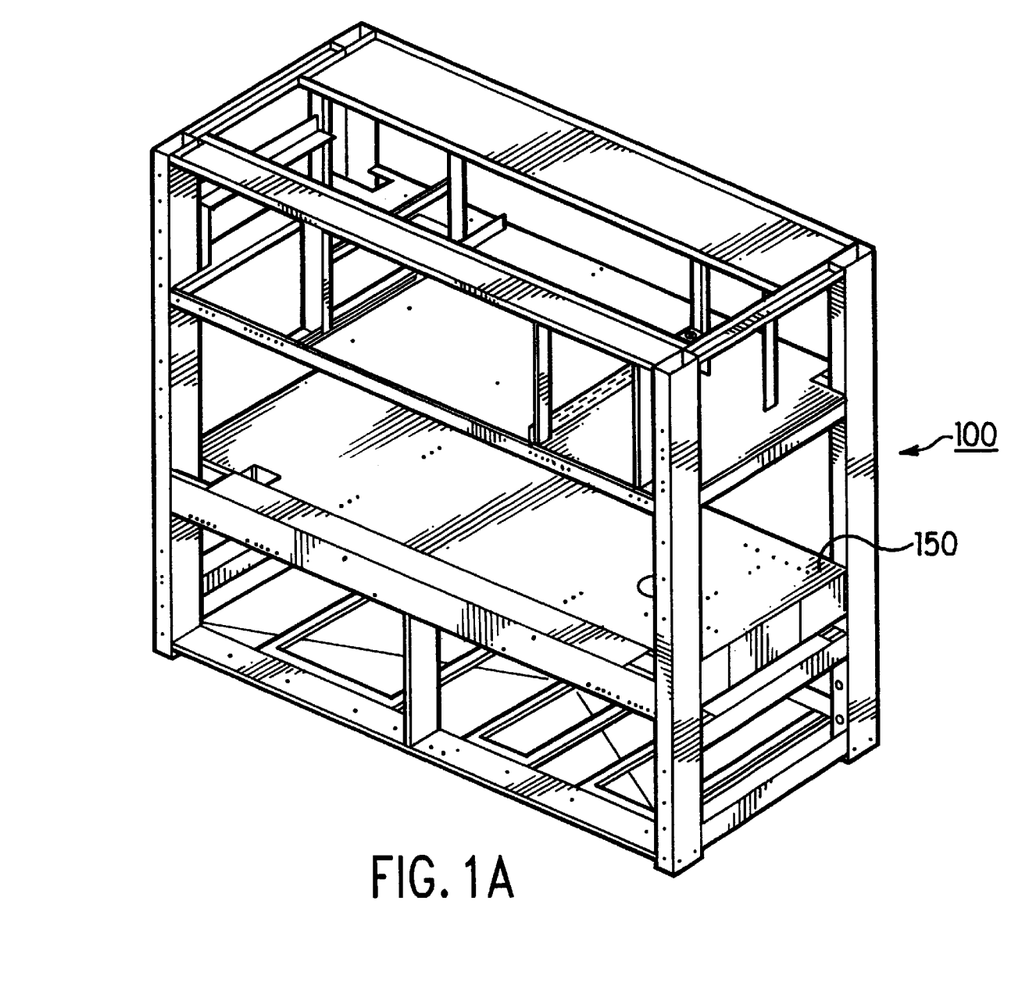
FIG. 1A is a drawing of a laser support frame.

FIG. 1 is a drawing showing the general location of the chamber and some of the optical equipment of a state of the art narrow band excimer laser used as a light source for integrated circuit lithography. The drawing shows laser chamber 156, line narrowing module 120, output coupler module 130 and wavemeter 140 and indicates the direction of output beam 142. This equipment plus numerous other equipment including electrical and gas support equipment needed for the operation of the laser are mounted on a laser support frame. A detailed description of a laser support frame for an excimer laser is described in U.S. Pat. No. 5,863,017 assigned to the assignee of the present application. This patent is incorporated herein by reference. FIG. 5A of that patent is substantially reproduced in this application as FIG. 1A. Laser support frame 100 includes chamber/optics platform 150 which is mounted within frame 100 on at three attachment points each of which points is a swivel joint comprising a ball-cup joint as described in U.S. Pat. No. 5,863,017. The purpose of this special mounting is to prevent any distortion of chamber/optics platform 150 as a result of forces applied to laser support frame 100.

Figure 2:
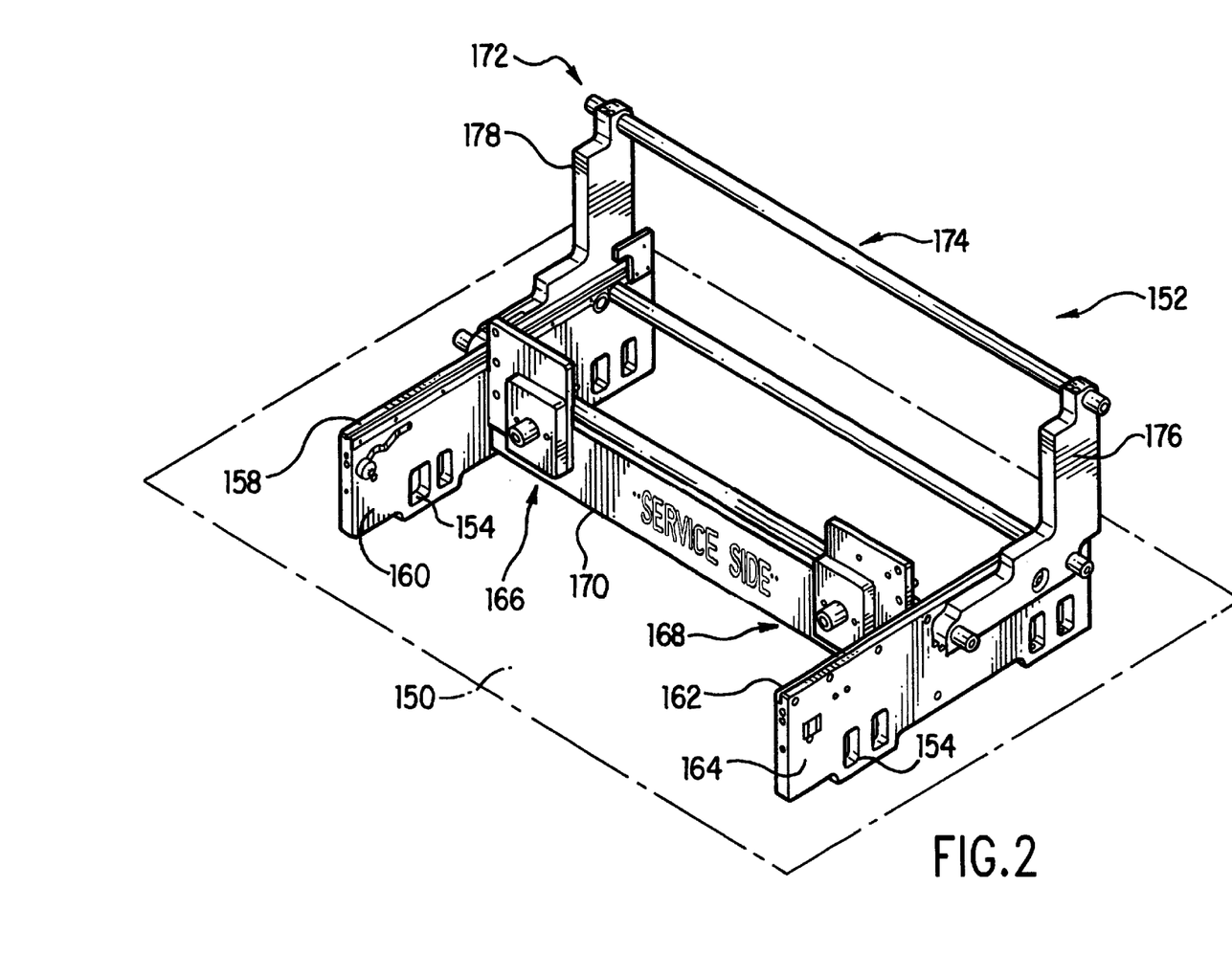
FIG. 2 is a chamber/optics platform.

FIG. 2 shows a chamber-optics support frame 152 which in this preferred embodiment is bolted onto chamber/optics platform 150 with eight bolts at locations 154. In this preferred embodiment support frame 152 supports a laser chamber on platform 150 and also supports the associated resonance cavity optics also on platform 150, and permits alignment of the laser optics with the laser chamber. However, the frame is designed to avoid or minimize distortions in the optical equipment resulting from thermal and vibrational purturbations in the chamber. This is accomplished as follows:

Chamber Rolls on Tracks on Cross Ribs

Figure 3:
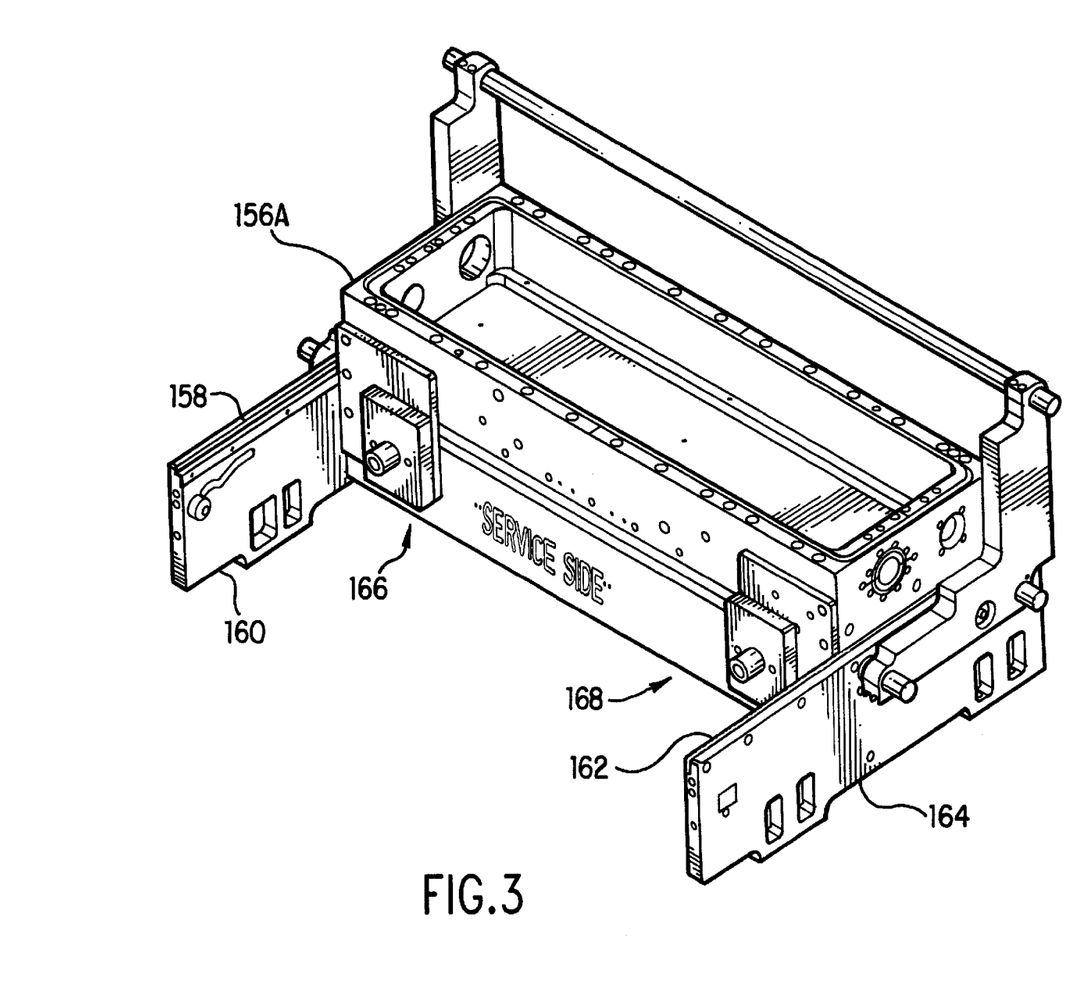
FIG. 3 shows a chamber bottom mounted in the FIG. 2 platform.
Figure 8:
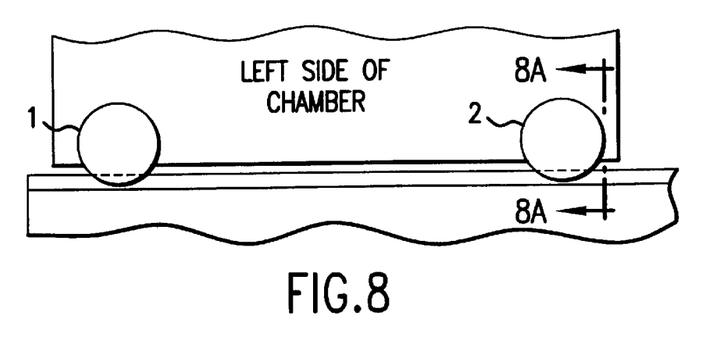
FIG. 8 is a drawing showing the left side of a chamber in a preferred embodiment and two wheels on the left side.
Figure 8A:
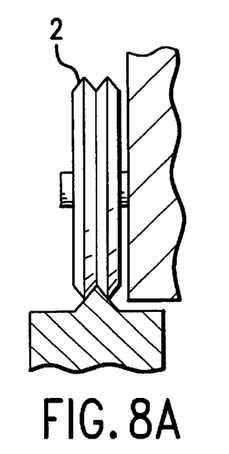
FIG. 8A is a drawing showing a front view of one of the wheels shown in FIG. 8.
Figure 9:
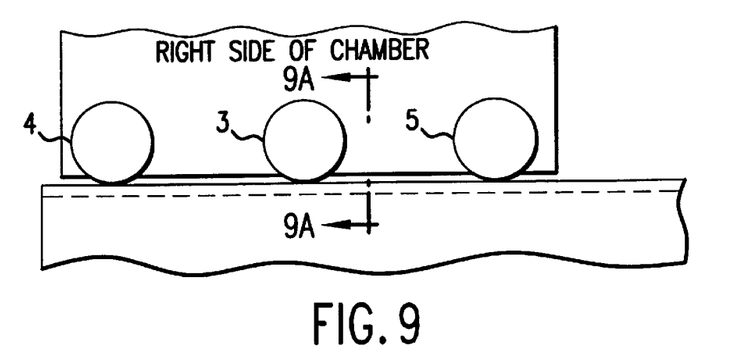
FIG. 9 is a drawing showing the right side of the chamber referred to in the description of FIG. 8 and showing three wheels.
Figure 9A:
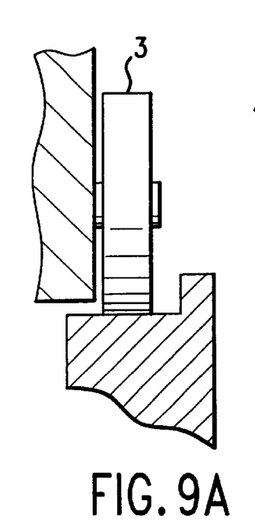
FIG. 9A is a drawing showing a front view of one of the three wheels on the right side.

The bottom portion 156A of the laser chamber 156 as shown in FIG. 3 is supported vertically by two cross ribs 160 and 164. The chamber bottom 156A is equipped with three metal wheels 1, 2 and 3 two of which (1 and 2) roll in V-track 158 in cross rib 160 as shown in FIGS. 8 and 8A and one of which, 3, rolls on flat track 162 on cross rib 164 as shown in FIGS. 9 and 9A during installation of the chamber and during operation these wheels provide vertical support for the chamber. (In this embodiment two additional wheels are provided on the flat track side of the chamber to aid in chamber installation and removal, but these wheels are elevated so that they do not furnish any support during laser operation.) The chamber is supported and aligned horizontally by flexible clamps 166 and 168 which attach to chamber bottom 156A and frame element 170 as shown in FIG. 3. The reader should note that the three roller vertical support permits unrestrained three dimensional thermal expansion and contraction of chamber 156. Flexible clamps 166 and 168 are described in detail below but for now the reader should note that these clamps are used to horizontally align the chamber with the chamber optics and to hold chamber 156 in close alignment with these optical components while at the same time decoupling blower caused high frequency chamber vibrations from the optical components.

Optics Support

Optics support structure 172, as shown in FIG. 2, consists primarily of output coupler support frame 176, line narrowing module support frame 178 and three cross bars 174 comprised of a iron-nickel alloy sold under the designation INVAR-36 by High Temp Metals, Inc. with offices in Sylmar, California. This material is designed to provide a minimal (almost zero) coefficient of thermal expansion in the temperature range of interest. The three bars are rigidly attached to output coupler support frame 176 and to line narrowing module support frame 178 but the bars are not directly attached to cross braces 160 or 164 but pass through holes in these cross braces. Optics support structure 172 is kinematically mounted on platform 150. Frames 176 and 178 are attached to cross braces 164 and 160 respectively with bearings so as to avoid any distortion of the optics support structure. Frame 176 is attached to cross brace 162 with a single ball joint bearing which permits rotation of frame 176 radially but restricts axial (i.e., in the direction of rods 174) motion, cross (i.e. in the direction of cross brace 164) motion and vertical motion of support structure 172. Frame 178 is attached to cross brace 160 in two places, first with an axial bearing which permits movement in the axial direction and second with a slot mounted axial bearing which permits axial motion and motion in the cross direction.

Flexible Clamps

Figure 4A:
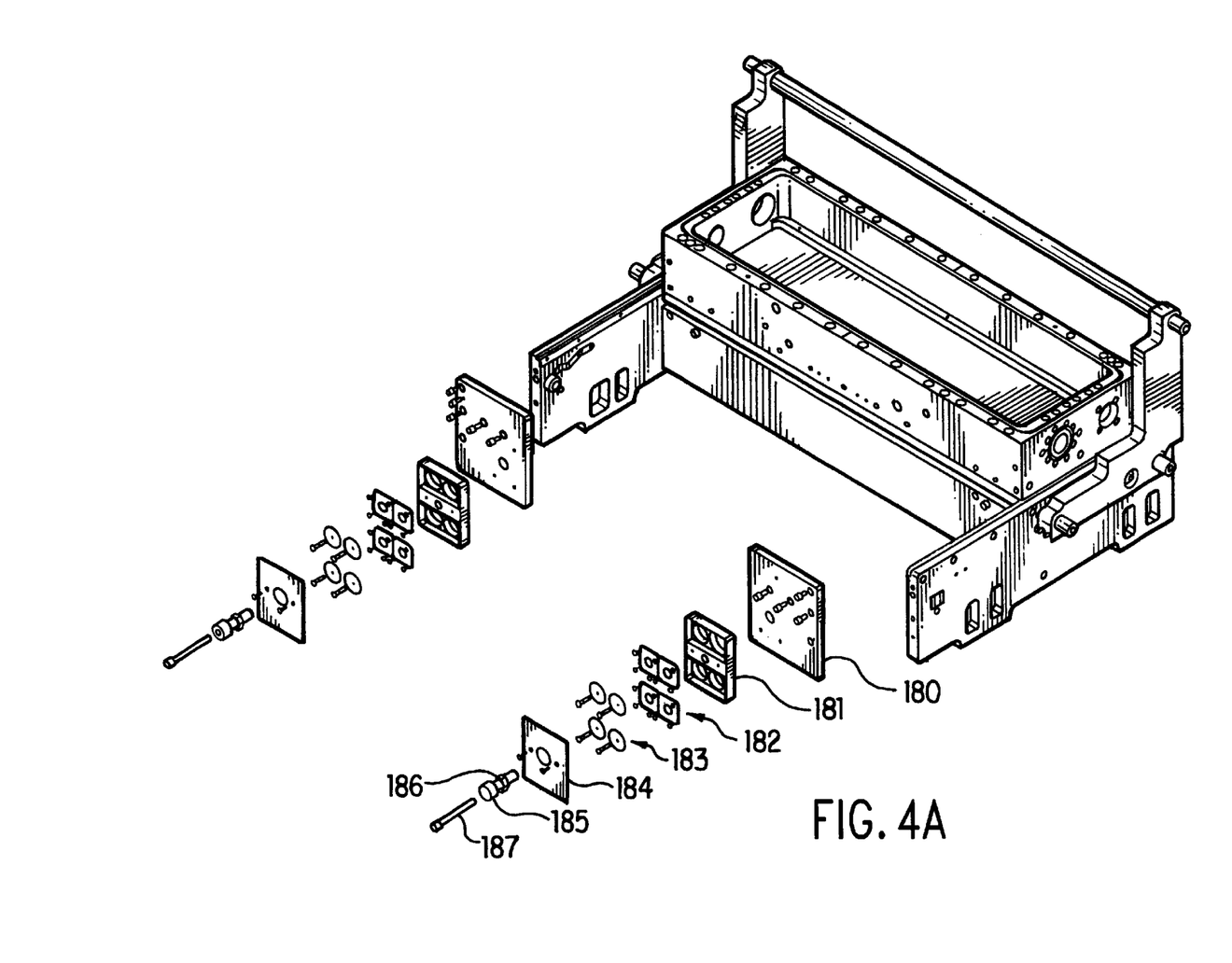
FIG. 4A is a drawing showing exploded views of two flexible clamps.

As stated above, flexible clamps 166 and 168 are used to align and to flexibly clamp chamber 156 horizontally in chamber optics support frame 152. The chamber bottom 156A is shown in FIG. 3 clamped into position with flexible clamps 160 and 168. An exploded assembly drawing of flexible clamp 166 is shown in FIG. 4A. It is comprised of interface plate 180, mounting plate 181, four silicon rubber Series AM 004 vibration isolators 182 available from Lord Corporation, Erie, Penn., four travel limiting washers 183, an isolator cover 184, an adjustment knob 185, an adjustment lock nut 186 and a clamping bolt 187.

Figure 4B:
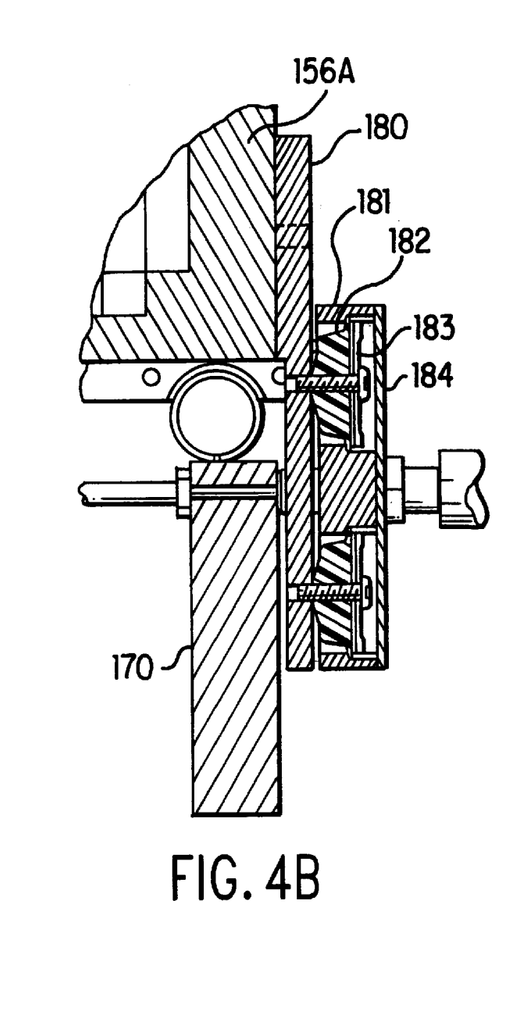
FIGS. 4B, 4C, and 4D are cross sectional drawings of a flexible clamp.
Figure 4C:
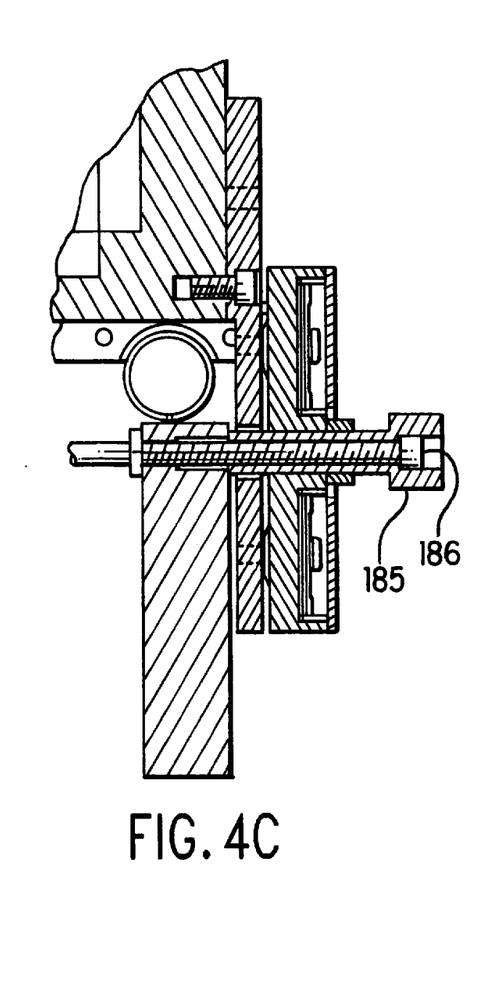
Figure 4D:
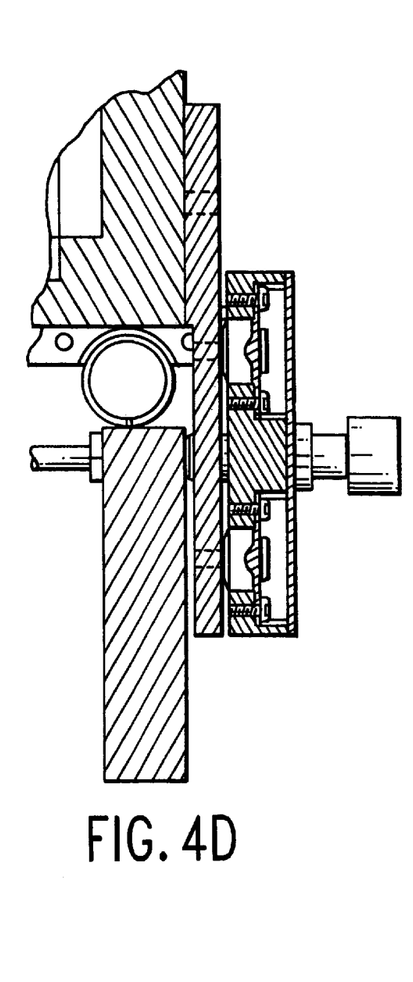

FIGS. 4B, 4C and 4D are cross sectional drawings of flexible clamps 168. Flexible clamp 166 is just like flexible clamp 168 except for the location of some of the bolt holes. FIG. 4B is a cross section through the center of silicon rubber vibration isolators 182. FIG. 4C is a cross section through the center of adjustment knob 185. FIG. 4D is a cross section through the center of two of the bolts holding down each of the vibration isolators.

Figure 4E:
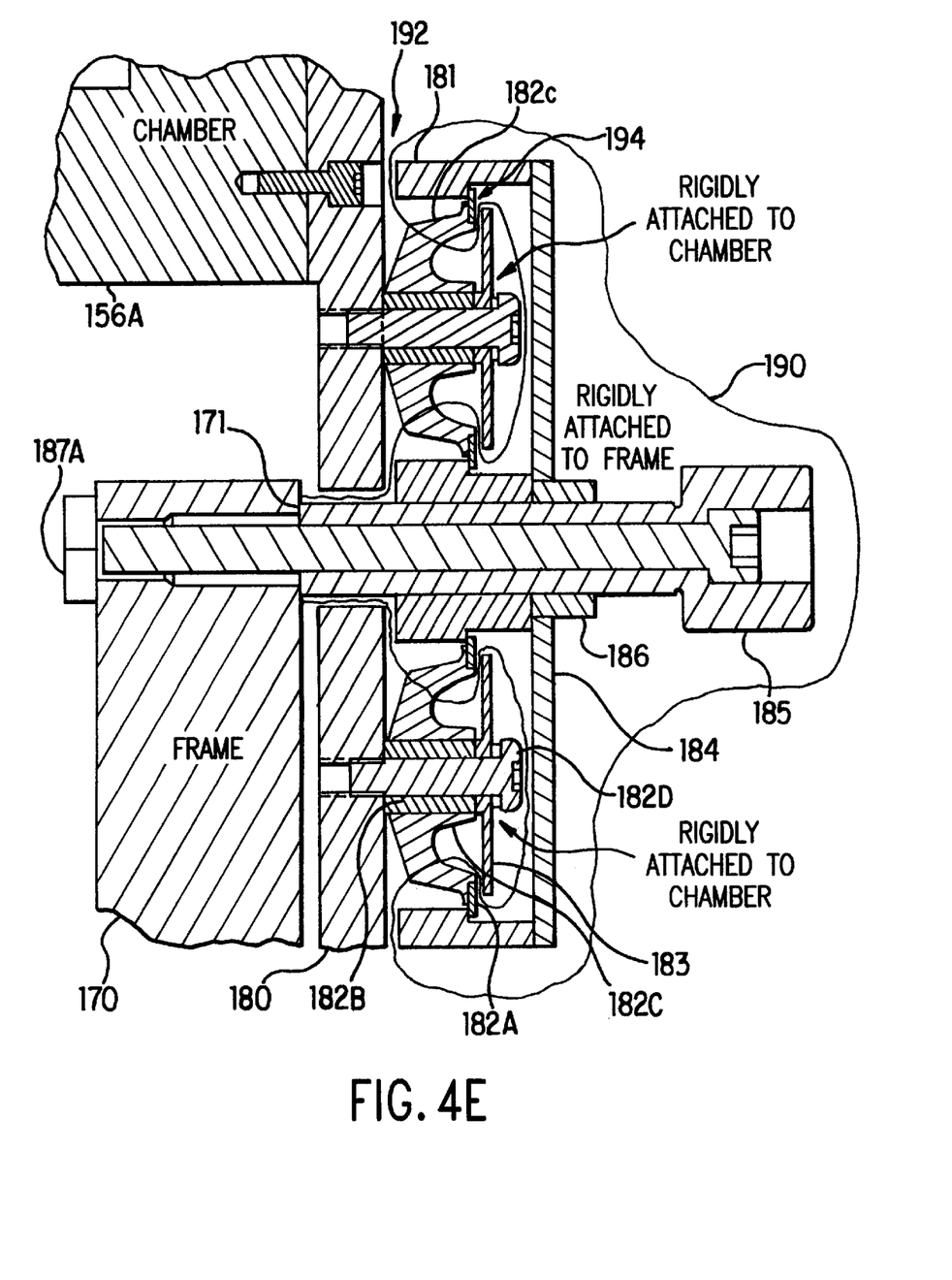
FIG. 4E shows a section of a flexible clamp in place.

FIG. 4E is disjointed cross section drawing through the center of isolators 182 and also through the center of adjustment knob 185. FIG. 4E demonstrates the functioning of the flexible clamps. As shown in FIG. 4E, isolator 182 is comprised of steel top plate 182A, steel isolator central cylinder 182B and silicon rubber damper 182C. Damper 182C is glued to cylinder 182B and top plate 182A and each top plate 182A is bolted to mounting plate 181 with four bolts shown in FIG. 4A but the bolts are not shown in FIG. 4E.

Cylinder 182B and travel limiting washer 183 are rigidly attached to interface plate 180 with hold down bolt 182D and a lock washer as shown in FIG. 4E. As shown in FIG. 4E interface plate 180 is rigidly attached to chamber bottom 156A. Adjustment bolt 185 threads through mounting plate 181 and rests solidly against frame 170 as shown at 171. Lock nut 186 holds bolt 185 in position. Clamping bolt 187 passes through the center of adjustment bolt 185 and screws into threaded receptor 187A to rigidly attach mounting plate 181 and other components within boundary line 190 (shown on FIG. 4E) to frame element 170.

Thus, with respect to potential rotary blower vibrations, the chamber is isolated in the cross horizontal direction by the eight silicon rubber dampers 182C in the two flexible clamps. Frame 100 is very stiff in the vertical direction so that the transfer of vertical vibrations from the this chamber through the frame elements to optical components is very small. The frame is much more susceptible to high frequency cross horizontal vibration but these are substantially isolated from the frame by the eight dampers 182C. There is also coupling in the longitudinal horizontal direction but in this direction, there is very little blower caused vibration because this is the direction of the blower axis.

Alignment

The flexible clamps described above are used to align the chamber horizontally as follows: Chamber 156 is rolled into approximate position on tracks 158 and 162.

Interface plate 182 is bolted onto chamber bottom 156A. With cover 181 removed mounting plate 181 is bolted onto interface plate 182 using isolator bolts 182D. Cover 181 is installed and adjustment bolt is screwed into mounting plate until the tip of adjustment bolt 185 rests against frame element 170 as shown at 171. Adjustment bolt 185 is then adjusted to align chamber 156 with the laser optics in line narrowing module 120 and output coupler module 130. When the laser is aligned lock nut 186 is tightened and lock bolt 187 is screwed into threaded nut 187A in frame element 170 to hold laser chamber in place relative to frame element 170. The reader shall note that if chamber removal is required, the position of adjustment bolt 185 and lock nut 186 should not be changed so that when the chamber is reinstalled realignment would normally not be required.

Horizontal Deflections

High frequency horizontal vibration forces are mostly absorbed in dampers 182C as indicated in FIG. 5A. The design of flexible clamp 182 limits deflections to less than 0.2 inches. Deflection is limited to the spaces shown at 192 and 194. Deflections greater than distances of about 0.2 inches could damage dampers 182C.

Vertical Vibration Isolation

Four techniques to providing vertical vibration isolation are shown in FIGS. 5, 6, 7A, 7B, 7C and 7D and 10 through 13.

Flexible Wheels

Figure 5:
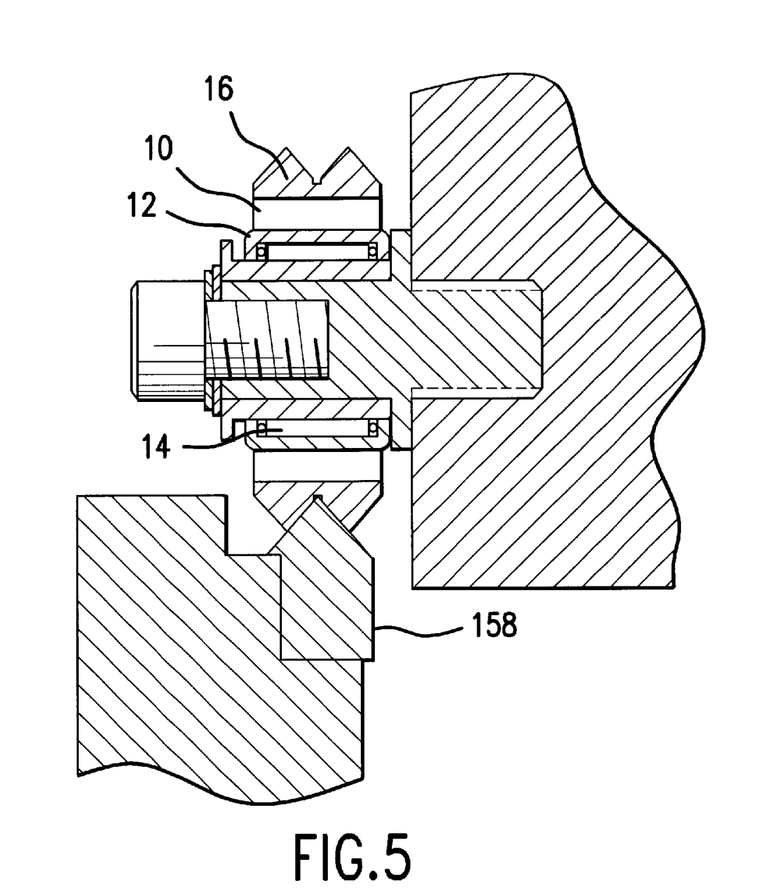
FIGS. 5 and 6 show wheels containing a flexible liner.
Figure 6:
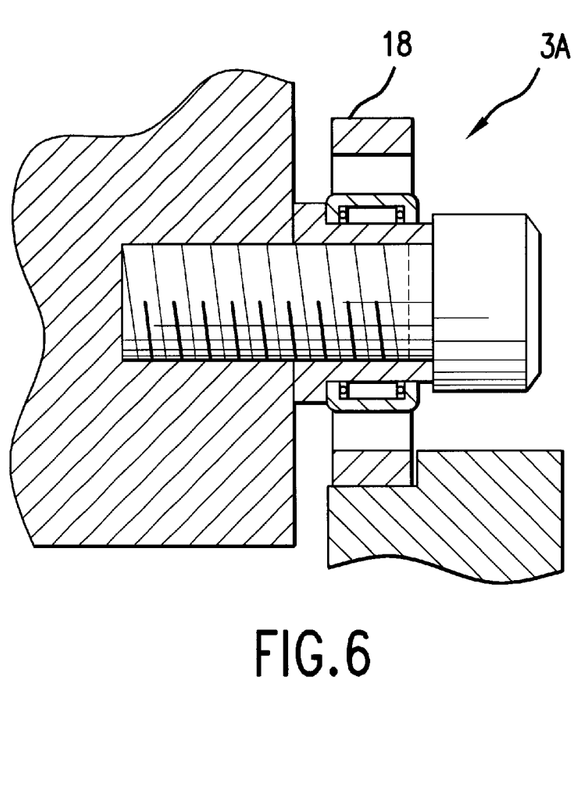

In a first preferred embodiment metal chamber wheels shown at 1, 2 and 3 in FIGS. 8, 8A and 9 and 9A are replaced by wheels 1A, 2A and 3A as shown in FIGS. 5 and 6. These wheels, comprised generally of induction hardened 420 stainless steel, include a co-axial polymer insert 10 and a needle bearing 12 comprising 26 needle rollers 14 which roll on sleeve 15. As shown in FIG. 5, the polymer insert (comprised of Delrin) serves as vertical vibration isolator between an outer steel "V" groove ring 16 of wheels 1A and 2A and the inside portion of the needle roller bearing. The outer steel "V" groove rides on the V rail as shown in FIG. 8A and FIG. 5. Wheel 3A is the same as wheels 1A and 2A except it is not as wide and its outer ring 18 has a cylindrical surface for riding on a flat track as shown in FIGS. 6 and 9A. In operation, the Delrin insert absorbs vertical vibrations produced in the chamber and reduces substantially the transfer of these vibrations to the laser optics. For greater vibration isolation a more flexible material such as neoprene rubber could be used instead of Delrin for the flexible insert, however, the more flexible material will produce greater constant deflection (produced by the heavy laser chamber) which must be taken into consideration.

Flexible Rails

Another approach for reducing vertical vibrations is to modify rails 158 and 162 shown in FIG. 3. In both rails the metal portion is divided and a 0.10 inch thick section of neoprene rubber 20 is bonded to both parts. The metal parts of the modified rails are comprised of 420 stainless steel hardened to 50 HRC. Preferably the rubber has a stiffness of about 40 to 70 durometer. This produces a deflection of about 0.010 inch with the constant load of the chamber weight of about 200 pounds. This embodiment provides substantially greater vibration isolation with less constant deflection due to the greater area of rubber supporting the mass of the chamber.

Figure 7A:
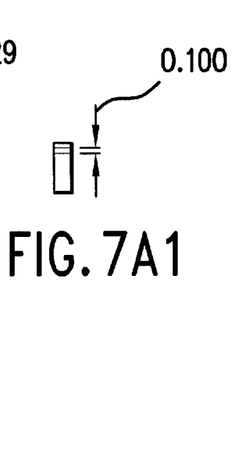
FIGS. 7A and 7B shows rails with a flexible liner.
FIGS. 7C and 7D show a metal support.
Figures 7A, 7B:
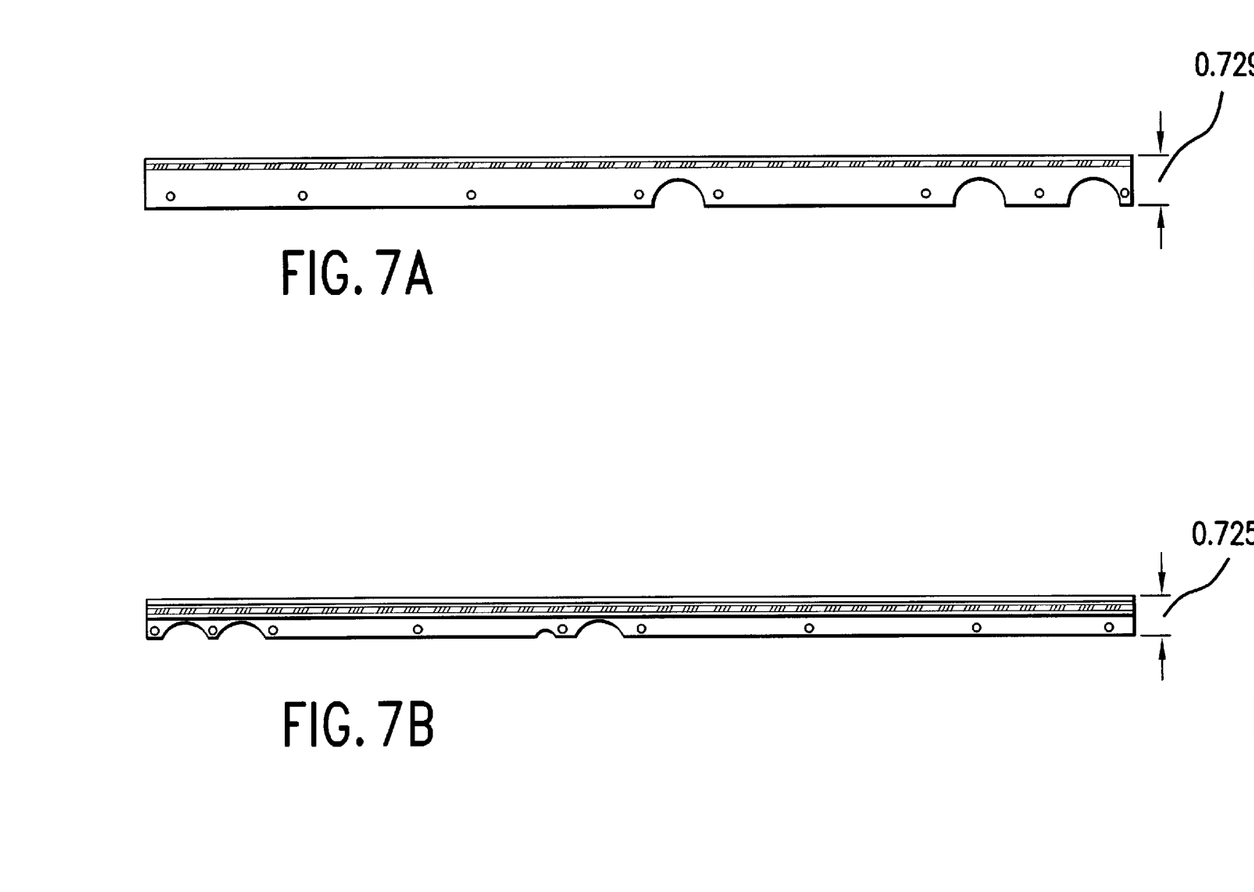
Figure 7B:
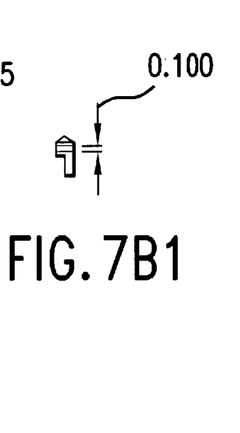
Figure 7C:
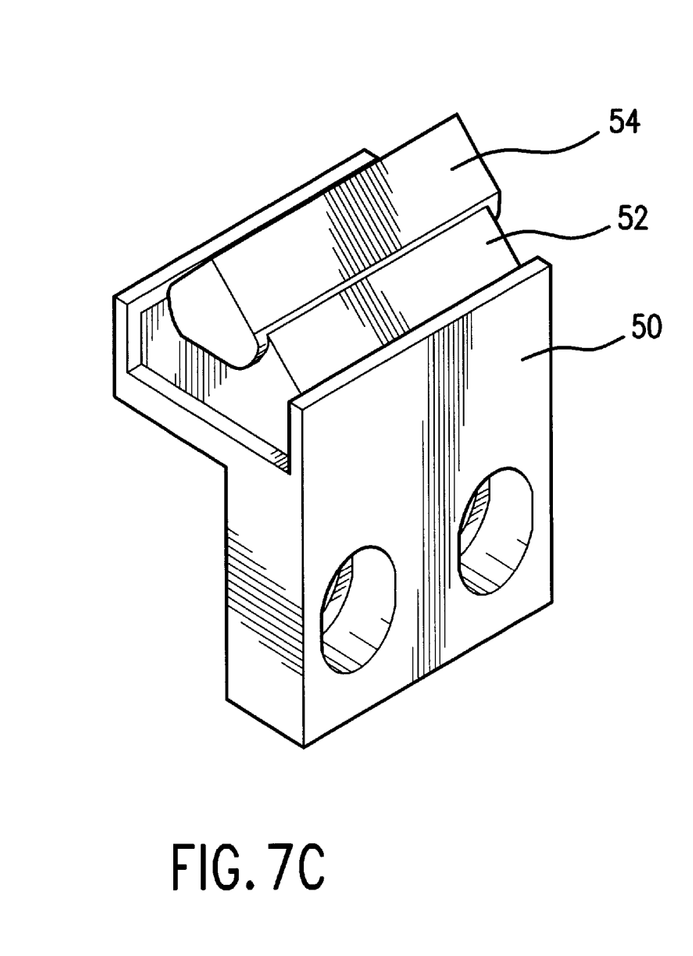
Figure 7D:
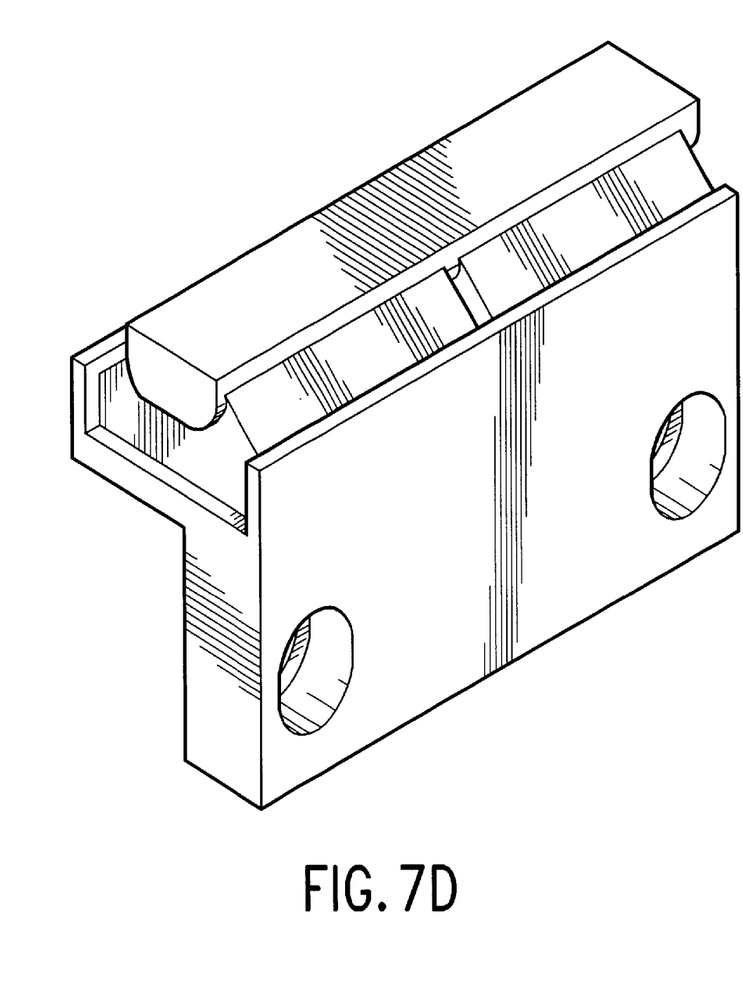

A slightly different approach is shown in FIGS. 7C and 7D. In this case, the rails 158 and 162 shown in FIG. 3 are modified by making flexible only the sections of the rails under the three wheels. In this case a one inch section of rail 158 under the two V shaped wheels (wheels 1 and 2 shown in FIG. 8) is cut out and replaced with a section shown in FIG. 7C. This section is comprised of metal support 50, elastomer vibration isolator 52 and V-shaped rail section 54. The preferred elastomer is comprised of V-16 polyurethane supplied by Newport Corporation with offices in Irvine, Calif. A similar flexible support is provided for a section of flat rail 162 (under wheel 3 shown in FIG. 9) except it is twice as long since it is supporting twice the weight of the section under the V-shaped wheels.

Transport Wheels and Vibration Pads

Figure 10:
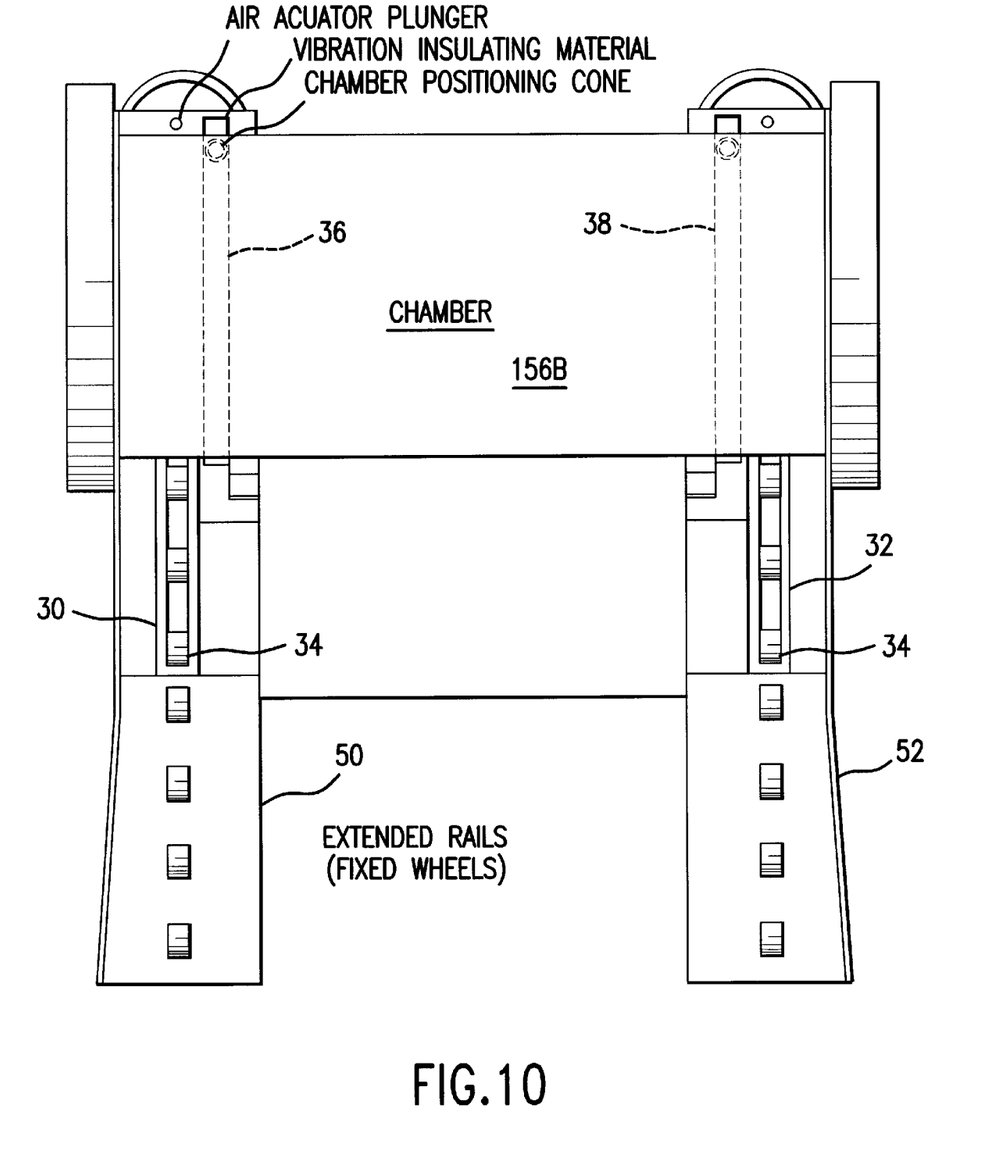
FIG. 10 shows features of an embodiment with isolation pads and a set of two roller tracks.
Figure 11:
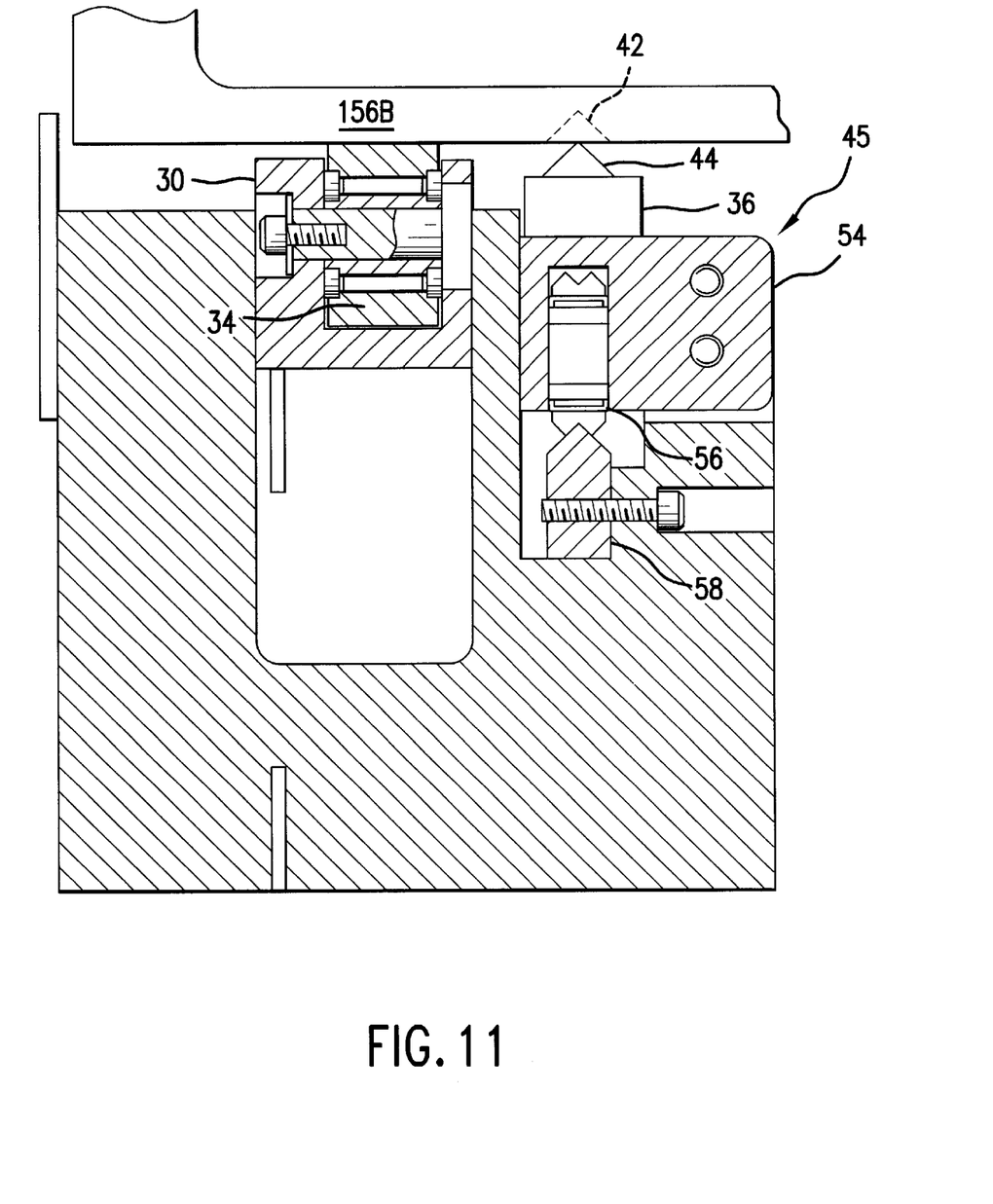
FIG. 11 is view of a portion of the FIG. 10 embodiment.
Figure 12:
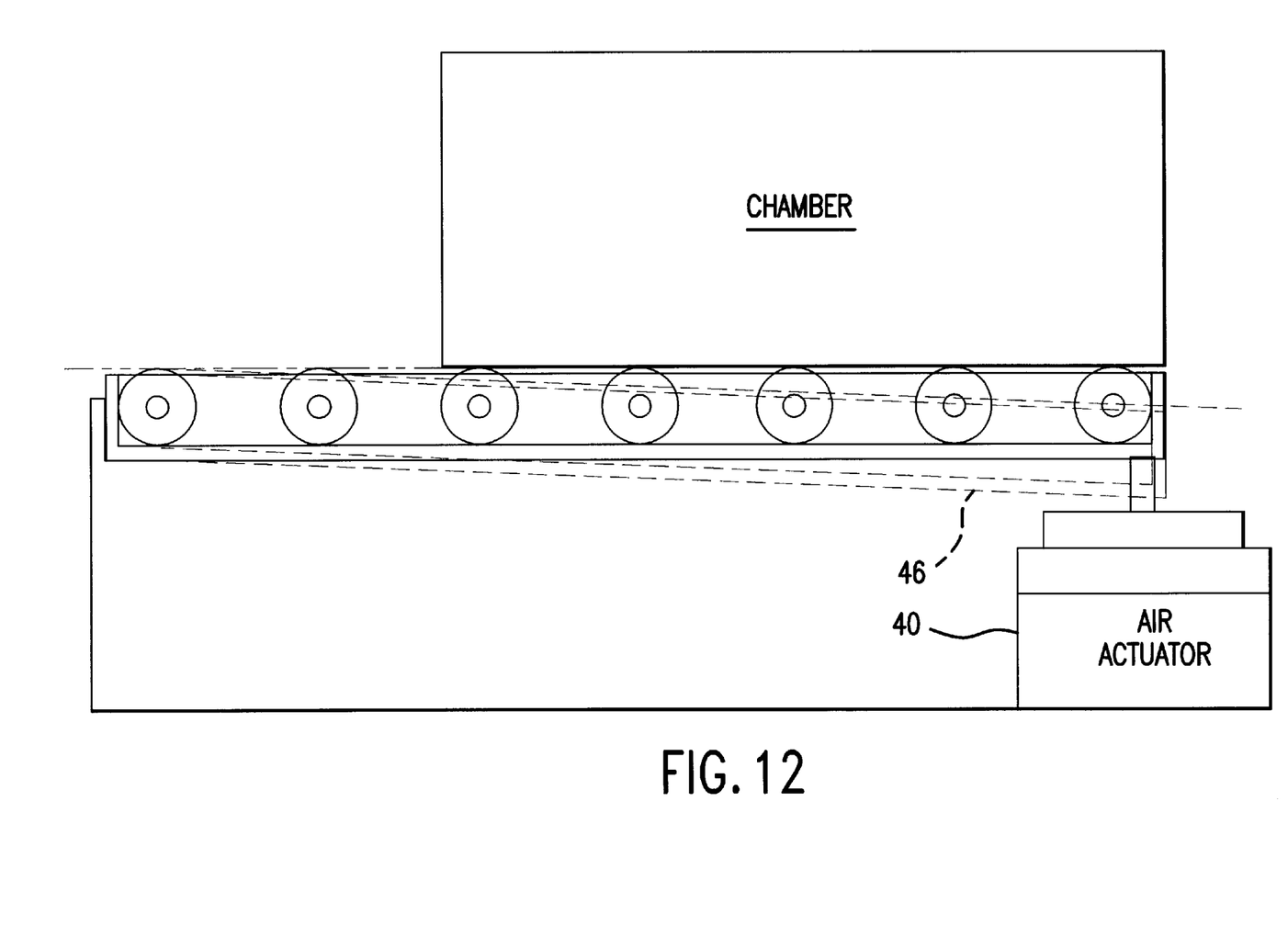
FIG. 12 shows hollers placed in position for removing or installing a chamber.

A third embodiment for providing ease of chamber replacement and vertical isolation is shown in FIGS. 10 through 13. In this embodiment, no wheels are attached to the chamber. The bottom of the chamber 156B is flat as shown in FIG. 11. The laser cabinet comprises a set of two built-in roller track assemblies, each assembly comprising seven roller bearings 34. These tracks are elevated to the position shown in FIG. 11 and in bold in FIG. 13 only during chamber removal and installation. During laser operation, the roller track assemblies are lowered to permit the bottom of the chamber to rest on flexible pad 36 which pad is shown in FIG. 11 and pad 38 which along with pad 36 is shown in FIG. 10. The raising and lowering of the roller track is provided by an air actuated drive unit 40 as shown in FIG. 12. This unit operates on plant service air or portable air bottle at about 40 psi and is configured for slow elevation and decent. A preferred unit is actuator model SS-300 provided by Mead Fluid Dynamics with offices in Chicago, Ill. In the raised position the tops of the seven rollers are about ¼ inch higher than the top of pad 36.

During installation, two rail extensions 50 and 52 having four rollers each are bolted to the laser cabinet in line with roller track assemblies 30 and 32 as shown in FIG. 10. Roller track assemblies 30 and 32 are held by actuator 40 in their raised position and the replacement chamber is rolled into position. The replacement chamber is aligned relative to pads 36 and 38 by positioning two conical indentures 42 in the bottom of chamber 156B over two alignment cones 44 at the inside ends of the pads 36 and 38. After the chamber is approximately aligned over the pads the chamber is slowly lowered by releasing air from actuator which lowers the roller track assemblies to the position shown in FIG. 12 leaving the chamber resting on vibration pads 36 and 38. Extended rails 50 and 52 are then removed.

Figure 13:
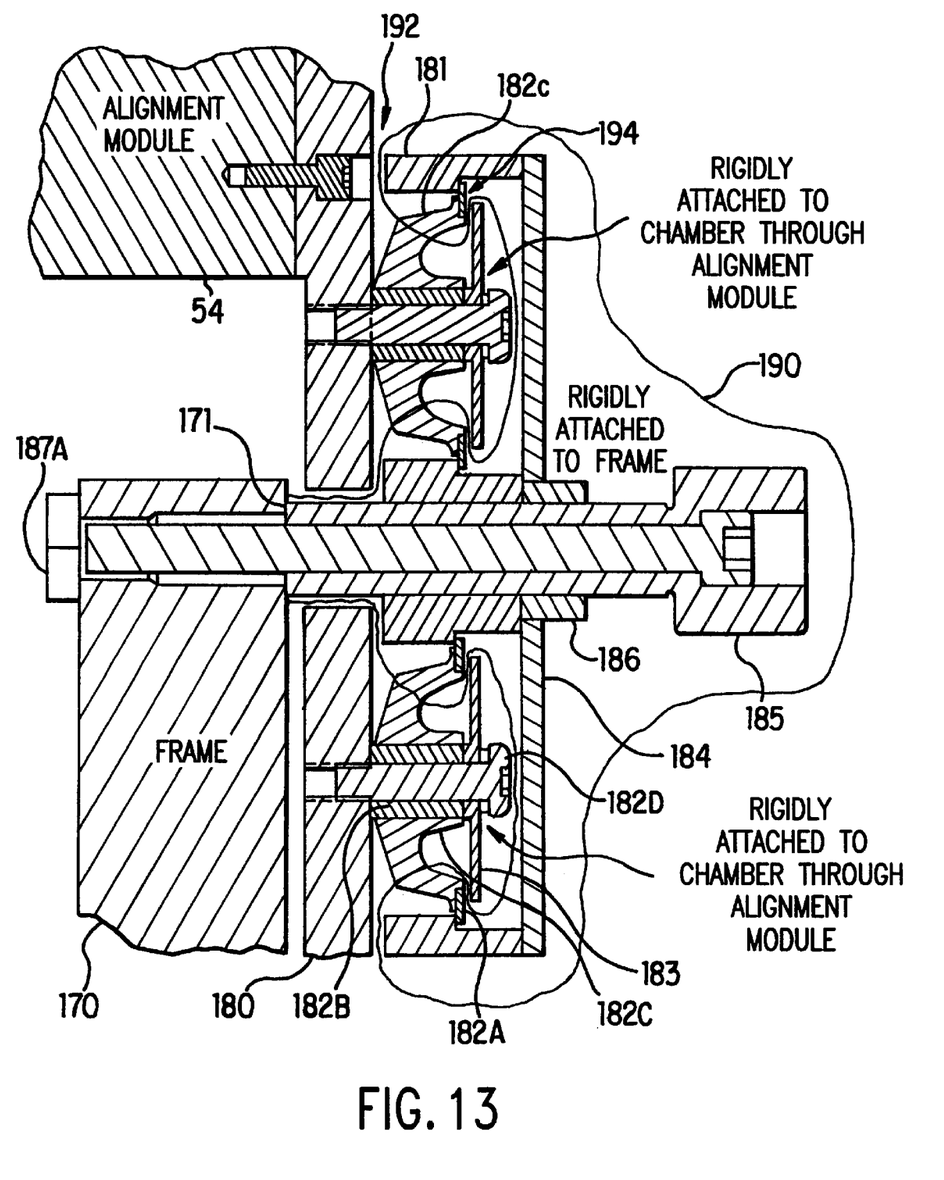
FIG. 13 shows the use of flexible clamps to clamp an alignment module.

Vibration pads 36 and 38 each rest on a chamber alignment module. These modules permit fine alignment of the chamber relative to the laser optics. The alignment module 45 on the LNP side of the chamber comprises a support bar 54 supporting vibration pad 36 and comprising two V track wheels 56 one of which is shown in FIG. 11. These wheels ride on all metal V track 58 solidly mounted to the laser frame. A similar alignment module is provided on the output coupler side of the laser, with two wheels which have a generally cylindrical shape and rides on a flat track similar to the configuration shown in FIG. 9A. The chamber can be aligned horizontally as explained above with reference to FIG. 4E or as shown in FIG. 13, the horizontal adjustment may be made by moving the chamber alignment modules which are supporting the chamber through the vibration pads 36 and 38.

Persons skilled in the art will recognize that many other embodiments of the present invention are possible based on the teachings expressed in the above disclosure.

Therefore, the reader should determine the scope of the present invention by the appended claims and their legal equivalents.

We claim:

1. A gas laser chamber/optics support structure for support of resonance cavity optical elements and a laser chamber, said structure comprising:
   A) a laser chamber defining a gain medium and a vibration source,
   B) a laser support frame,
   C) a chamber/optics platform mounted on said laser support frame,
   D) at least two resonant cavity optical elements mounted on said chamber/optics platform,
   E) a first track support defining a first track and a second track support defining a second track, said laser chamber being rollingly supported on said first and second tracks with at least three wheels,
   F) at least one flexible clamp for flexibly clamping said chamber in a desired horizontal position for alignment of said chamber with said resonant cavity optical elements and for reducing vibration coupling from said chamber vibration source to said resonant cavity optical elements,
   G) a vertical vibration isolator for isolating vibration originating in the chamber from said resonant cavity optical elements, and
   H) at least three wheels supporting said chamber directly or indirectly on said first and second track.

2. A structure as in claim 1 wherein said at least three wheels is three wheels.

3. A structure as in claim 2 wherein said first track is a groove track, wherein two of said three wheels are supported on said groove track and said second track is a flat track wherein one wheel is supported on said flat track.

4. A structure as in claim 1 wherein said flexible clamp comprises a mounting plate and an adjustment bolt threaded through said mounting plate to an extent necessary to align said gain medium in said chamber with said resonance cavity optical elements.

5. A structure as in claim 4 wherein a portion of each of said at least one flexible clamp defines a first portion rigidly mounted to said chamber and a second portion rigidly mounted to said frame and wherein said flexible clamp comprises a plurality of dampers positioned to separate said first portion from said second portion.

6. A structure as in claim 4 wherein said at least one clamp is two clamps and said plurality of dampers is four dampers.

7. A structure as in claim 1 wherein said vertical vibration isolator comprises at least three wheels each wheel comprising a flexible insert.

8. A structure as in claim 7 wherein said insert is co-axial.

9. A structure as in claim 7 wherein said vertical vibration isolator comprises a flexible liner disposed within said first track and said second track.

10. A structure as in claim 9 wherein said flexible liner is comprised of rubber.

11. A structure as in claim 9 wherein said flexible liner is a material having a stiffness within the range of about 40 to 70 durometers.

12. A structure as in claim 1 and further comprising an isolatable set of at least two roller track assemblies for use in removing and installing said chamber wherein said set of tracks are isolated from said chamber during laser operation.

13. A structure as in claim 12 wherein said vertical vibration isolator comprises at least two flexible pads.

14. A structure as in claim 13 wherein said flexible pads are comprised of a flexible polymer.

15. A structure as in claim 14 wherein said flexible polymer is Delrin.

16. A structure as in claim 13 wherein each of said at least two flexible pads is mounted on a chamber alignment module.

17. A structure as in claim 16 wherein said at least one flexible clamp is at least two flexible clamps each being clamped to an alignment module.

* * * * *